G. E. STEVENS.
ELECTRICALLY HEATED TOOL.
APPLICATION FILED SEPT. 16, 1908.
1,010,529. Patented Dec. 5, 1911.
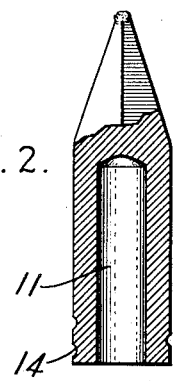
Fig. 2.
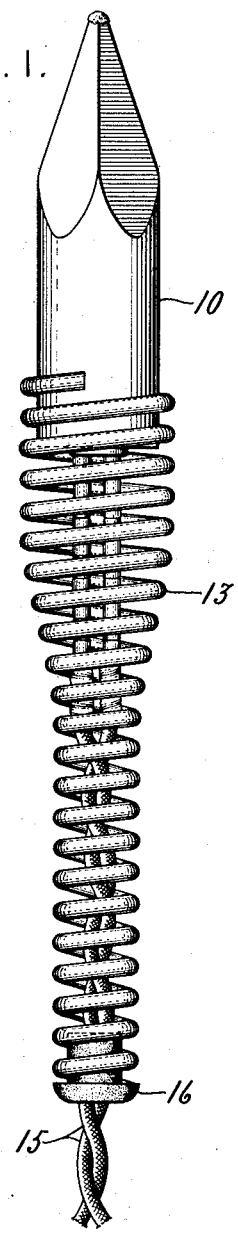
Fig. 1.
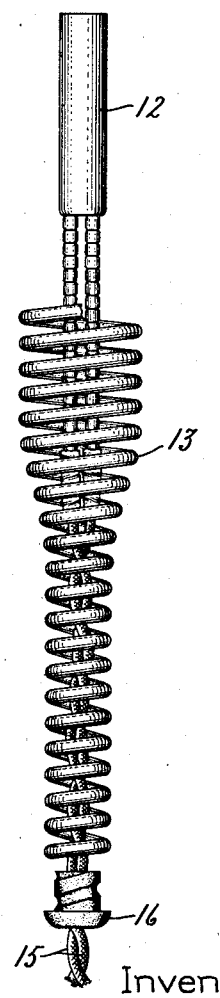
Witnesses:
George W. Tilden
J. Ellis Glen
Inventor:
George E. Stevens,
by
Att'y.

UNITED STATES PATENT OFFICE.

GEORGE E. STEVENS, OF LYNN, MASSACHUSETTS, ASSIGNOR TO GENERAL ELECTRIC COMPANY, A CORPORATION OF NEW YORK.

ELECTRICALLY-HEATED TOOL.

1,010,529. Specification of Letters Patent. Patented Dec. 5, 1911.

Application filed September 16, 1908. Serial No. 453,291.

*To all whom it may concern:*

Be it known that I, GEORGE E. STEVENS, a citizen of the United States, residing at Lynn, in the county of Essex and State of Massachusetts, have invented certain new and useful Improvements in Electrically-Heated Tools, of which the following is a specification.

This invention relates to electrically heated tools, and has for its object the provision of a device of this character which is extremely simple in construction and which can be brought to a working temperature rapidly and efficiently.

My invention relates more particularly to such tools as soldering irons and the like, in which an end or point of metal is brought up to a definite temperature.

One of the objects of my invention is to so construct the soldering iron that the tip, as well as the heating unit, may easily be removed while at the same time making an efficient heat conducting joint between the unit and the tip.

Another object of my invention is to provide a flexible handle for the iron, thereby affording great convenience in operation. The handle is likewise ventilated, and permits the conductors leading to the heating unit to be supported without danger of breaking.

Other objects of my invention will appear in the course of the following specification, in which I have shown my invention embodied in concrete form for purposes of illustration.

In the drawings embodying one form of my invention, Figure 1 is an elevation of a complete soldering iron, and Fig. 2 is a sectional view of the same, with the soldering tip partly in section.

Referring to the drawings, 10 represents the metallic body or mass to be heated. This body is shown as a soldering tip which is made of suitable material, generally copper. This tip is pointed in the usual way and is chambered at 11 in any desired manner, as by being bored or cored out. This chamber 11 is adapted to receive an electric heating unit 12. The particular heating unit to be used in this soldering iron forms no part of my invention; but for purposes of illustration I have shown a cartridge unit of the type described and claimed in my Patent No. 803,795. It is desirable, however, that the resistance conductor be of such a nature that it will stand a high heat without oxidation, and I, therefore, have found that for this purpose a chrome-nickel conductor, such as is described and claimed in the patent to Dempster No. 901,428 answers the purpose, although it should be understood that this is not essential to my invention. The heating unit enters the tip with an easy fit, so that when it heats and expands it will make a good thermal joint with the tip. The handle of this iron consists of a coiled spring 13 of iron, steel, or other material, which is secured to the tip and is made by winding a spring wire in the form of an open spiral as shown. The inner end of this spring is large enough to screw on to the tip at the short thread 14. The spring is tapered down to form a convenient size for a handle. The electric conductors or leads 15 pass through the spring handle to the heating unit and are supported at the outer end of the spring by a sleeve 16 of wood, or other material, which screws into the spring. The handle is thus flexible and ventilated, and may, therefore, be used in a manner impossible with a rigid handle. The conductors are moreover safe against abrasion.

The operation of taking the iron apart is a very simple one, although it cannot be done simply by unscrewing the handle. It will be seen that if an attempt is made to screw the spring in either direction with reference to the tip that it will lock more securely therein. It is, therefore, necessary in removing the handle to use a tool which will unscrew the spring without flexing it.

It will be seen that I have provided a tool which is exceeding simple in construction, being provided with few parts, which are easily assembled.

While I have shown and described my invention as constructed in a specific manner in accordance with the patent statutes, it should be understood that I do not limit my invention thereto, since various modifications will suggest themselves to those skilled in the art without departing from the spirit of my invention, the scope of which is set forth in the annexed claims.

What I claim as new and desire to secure by Letters Patent of the United States is,

1. An electric soldering iron comprising an elongated metallic tip, an electric heating unit inserted in one end thereof, and a flexible coiled spring having one end secured to said end of the tip and extending longitudinally of the tip to form a handle.

2. An electrically heated tool, comprising a metallic body, an electric heating unit therefor provided with conductors and a flexible handle surrounding the conductors.

3. An electrically heated tool, comprising a metallic body, an electric heating unit therefor provided with conductors, and a flexible handle consisting of a coiled spring handle secured to the metallic body and surrounding the conductors.

4. An electric soldering iron, comprising a metallic tip provided with a short screw thread, an electric heating unit therefor, and a coiled spring screwed on to the tip to form a flexible handle.

5. An electric soldering iron, comprising a metallic tip, an electric heating unit within the same provided with conductors, and a coiled spring secured to the tip and surrounding the conductor to form a flexible handle.

6. An electric soldering iron comprising a metallic tip, an electric heating unit therein, a flexible handle, a non-conducting bushing screwed in the open end thereof and leading conductors for the heating unit within the handle and threading the bushing.

In witness whereof, I have hereunto set my hand this fourteenth day of Sept., 1908.

GEORGE E. STEVENS.

Witnesses:
JOHN A. McMANUS, Jr.,
CHARLES A. BARNARD.